United States Patent [19]

Sisk

[11] 4,186,317
[45] Jan. 29, 1980

[54] ENDPLATE WITH CAST-IN BAFFLE

[76] Inventor: Hollis D. Sisk, 329 Ridge Meadow, Chesterfield, Mo. 63017

[21] Appl. No.: 893,057

[22] Filed: Apr. 3, 1978

Related U.S. Application Data

[63] Continuation of Ser. No. 730,369, Oct. 7, 1976, abandoned.

[51] Int. Cl.² ............................................. H02K 9/00
[52] U.S. Cl. .................................. 310/60 R; 310/62; 310/63
[58] Field of Search ........................................ 310/58–65

[56] References Cited

U.S. PATENT DOCUMENTS

| | | | |
|---|---|---|---|
| 2,222,764 | 11/1940 | Gaston | 310/60 |
| 2,357,923 | 9/1944 | Anderson | 310/60 |
| 2,545,855 | 3/1951 | Luenberger | 310/58 |
| 2,825,827 | 3/1958 | Luenberger | 310/63 X |
| 2,967,959 | 1/1961 | Waters | 310/63 |

Primary Examiner—Donovan F. Duggan
Attorney, Agent, or Firm—James R. Bell

[57] ABSTRACT

An electric motor of the type including a housing, a shaft extending through the housing, blower blades mounted on the shaft and an endplate mounted on the housing is improved due to the inclusion of a partial baffle formed with the endplate and extending toward and in proximity with the blower blades for forming a partial annular spaced interface with the blower blades.

2 Claims, 9 Drawing Figures

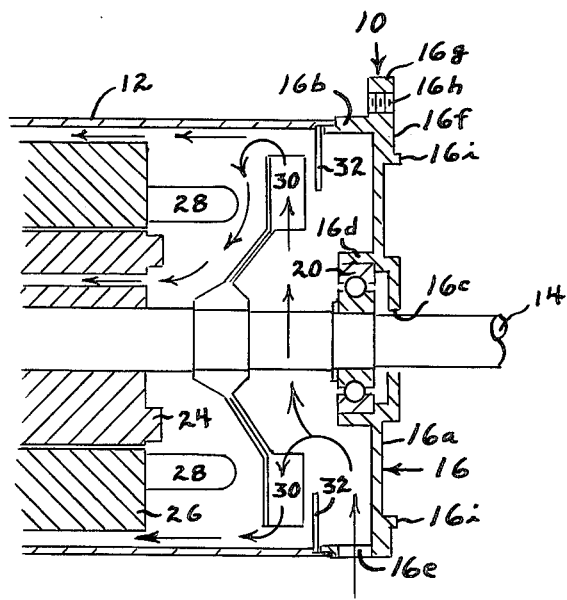
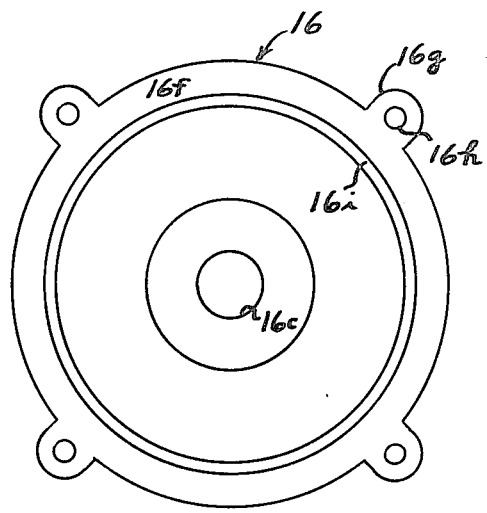
FIG 1a
PRIOR ART
FIG 1b
PRIOR ART
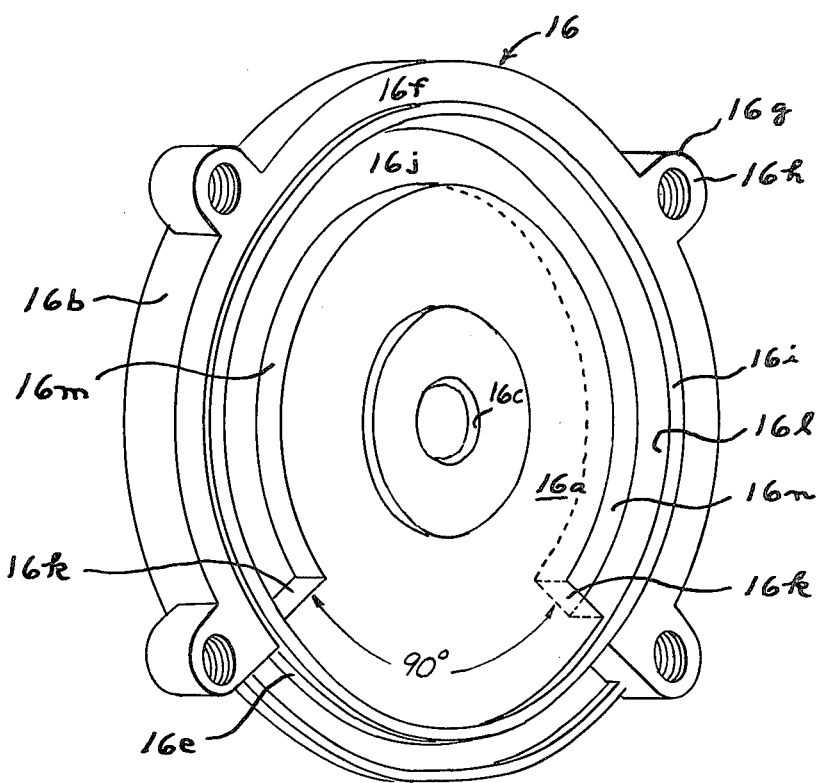
FIG 2

ENDPLATE WITH CAST-IN BAFFLE

This is a continuation of application Ser. No. 730,369, filed Oct. 7, 1976, now abandoned.

BACKGROUND OF THE INVENTION

1. Field of the Invention

This invention relates generally to electrical generator or motor structure of the rotary dynamo-electric type and more specifically to the cooling or fluid contact thereof.

2. Description of the Prior Art

Generally, rotary type dynamo-electric machines have many applications including the driving of centrifugal pumps for pumping water and the like. The motor shaft is generally coupled to the pump shaft and thus the motor and pump are usually in very close or even abutting relationship.

Motors not used for pumping water include ventilated endplates for the purpose of cooling the motors. Such ventilated endplate usually include openings in the face of the endplate to draw air therethrough. Of course, when motors are used in proximity with water pumps, care must be exercised to assure that water from the pump does not enter the motor.

To preclude the entry of water into the coils of the motor, the prior art has devised a solid face type end plate including vent openings in the sides rather than through the face of the plate. A separate baffle is included and placed in proximity with the motor blower blades to effect a cooling path of air across the motor coils.

Such endplate side venting in conjunction with baffles presents an efficient cooling system and limits the chance of water entry into the motor. However, the use of separate baffles is costly due to the cost of the part and the cost of installation. It would be of benefit to the motor industry and to the consumer if a baffle arrangement could be devised which obviated the inclusion of a separate baffle part and the installation thereof. Also, the prior art did not consider it possible to provide a molded-in or cast-in baffle with a solid face type endplate and having side vents due to the belief that a baffle was needed to form a full annular spaced interface with the rotating blower blades. The reason for this is that such an endplate would require a complex and costly mold including coring and side-pulls. Therefore, it would be of added benefit if a relatively simple economical cast-in baffle endplate could be produced.

SUMMARY OF THE INVENTION

According to the present invention, an endplate includes as part of the endplate casting or mold, a baffle-like structure and a vented sidewall so that the benefits of the blower blade/baffle combination can be preserved in connection with a solid face-type endplate while the additional cost saving benefits of eliminating the baffle as an extra part both as to production and installation can also be realized. Also, it has been surprisingly and unexpectedly discovered according to the present invention that less than a full annular spaced interface between the baffle and blower blades permits adequate cooling. It has been further discovered that an endplate having a cast-in or molded-in baffle can be produced by an economical conventional two piece mold without requiring either coring or side pulls.

The foregoing is accomplished by providing a baffle cast in the endplate structure so as to axially extend toward and in proximity with the blower blades forming a partial annular spaced interface therewith.

Other advantages and novel features of the invention will become apparent from the following detailed description of the invention when considered in conjunction with the accompanying drawings.

BRIEF DESCRIPTION OF THE DRAWINGS

In the drawings wherein like parts are marked alike:

FIG. 1(a) illustrates a partial cross-sectional side elevation of a prior art motor-baffle-endplate arrangement;

FIG. 1(b) illustrates a plan view of the prior art endplate shown in FIG. 1(a);

FIG. 2 illustrates an isometric view of the novel endplate of this invention,

DESCRIPTION OF THE PREFERRED EMBODIMENT

Figure 3A:
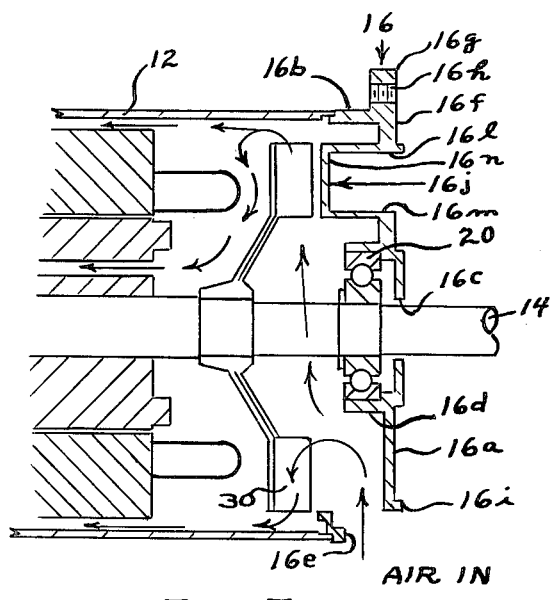
FIG. 3(a) illustrates a partial cross-sectional side elevation of a prior art motor having the novel endplate including a baffle as taught by this invention.
Figure 3B:
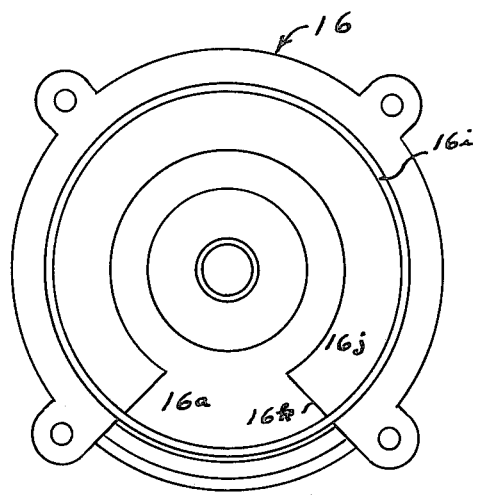
FIG. 3(b) illustrates a plan view of the endplate of FIG. 3(a)

In the drawings, FIGS. 1(a), (b), illustrate generally an electric motor 10 including a housing 12 and shaft 14 extending through the housing. Face-type endplate 16 is fixedly mounted on housing 12 and includes annular disc endwall portion 16(a) and annular tubular sidewall portion 16(b) formed therewith. A centroidal opening 16(c) is provided in the endplate to permit shaft 14 to pass therethrough. The shaft is rotatably mounted in endplate 16 due to bearing 20 secured in bearing mounting portion 16(d) of the endplate. Rotor 24 is fixedly mounted on shaft 14 for rotation therewith adjacent and relative to stator 26 and related coils 28 fixedly mounted in the housing. Blower blades 30 are also mounted on shaft 14 for 360 degree rotation therewith. Baffle 32 is formed as an annular closed ring and is fixedly mounted between housing 12 and endplate 16 to form a spaced annular interface with the rotating blower blades. Slots 16(e) are provided in sidewall portion 16(b) endplate 16 to permit air to be drawn therethrough for passage between blower blades 30 and baffle 32 and ultimately past the rotor 24 and stator 26 for cooling thereof. Flange 16(f) of endplate 16 is provided with ears 16(g) having threaded openings 16(h) therein for securing motor 10 to a pump or the like (not shown). Annular locating bead 16(i) is provided for properly locating the pump adjacent motor 10 as is well known.

FIGS. 2-5 illustrate that a face-type endplate 16 can be provided to include a novel baffle 16(j) formed therewith so that the endplate and baffle are intergratedly formed as a unit. Endplate 16, FIGS. 2, 3(a) and 3(b) is preferably of cast iron or other suitable metal or molded of a suitable synthetic material and includes annular disc-like endwall portion 16(a) and annular tubular sidewall portion 16(b). Centroidal opening 16(c) is provided in the endwall to accommodate shaft 14. Bearing mounting portion 16(d) is formed on endwall 16(a) for accommodating bearing 20. Vent or slot 16(e) is provided in sidewall 16(b). Flange 16(f) includes ears 16(g) having threaded openings 16(h) therein for securing the motor to a pump (not shown). Locating bead 16(i) is annular and is provided for locating the motor and its associated pump as is well known in the prior art.

The novel endplate 16 of this invention includes, in addition to the above-mentioned features of the prior art, face-type endplate, a partial annular cylindrical baffle portion 16(j) formed with the endwall portion and protruding therefrom adjacent to and concentric with the sidewall portion 16(c). By partial annular baffle is meant that the baffle does not form a closed ring but is similar to a ring with a segment removed. Baffle 16(j) therefore is a partial annular baffle comprising a 270 degree ring-like structure having a 90 degree segment removed. The removed segment therefore forms an opening 16(k) therein thus avoiding the annular closed ring type baffle as taught by the prior art. Opening 16(k) formed in baffle 16(j) corresponds to opening 16(e) formed in sidewall 16(b).

Preferred baffle 16(j), FIG. 3(a), includes first tubular baffle portion 16(l) formed with and axially protruding from endwall 16(a) and similar second baffle portion 16(m) concentric with portion 16(l). The baffle terminates at disc-like radially extending face portion 16(n) interconnecting the tubular baffle portions 16(l), 16(m) and predeterminately spaced from endwall 16(a).

Figure 4A:
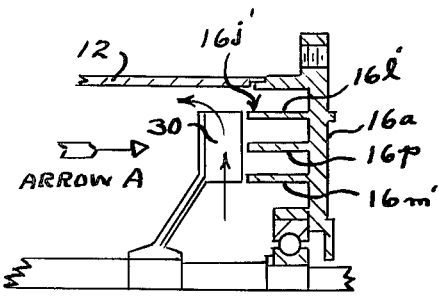
FIG. 4(a) illustrates a partial cross-sectional side elevation of a prior art motor having an alternative embodiment of the novel endplate including a baffle as taught by this invention.
Figure 4B:
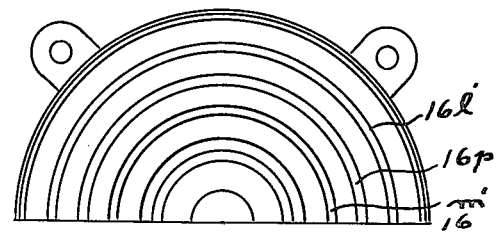
FIG. 4(b) illustrates a plan view of the endplate of FIG. 4(a) viewed in the direction of arroa "A"

In FIG. 4(a), it can be seen that alternative baffle 16(j)' includes first and second concentric tubular baffle portions 16(l)', 16(m)' formed with and axially protruding from endwall 16(a) and also includes third concentric tubular baffle portion 16(p) interposed between the first and second baffle portions and formed with and protruding from endwall 16(a). Thus, the baffle terminates at a face portion predeterminately spaced from endwall 16(a) comprising, a plurality of concentric rings 16(l)', 16(m)' and 16(p).

Figure 5A:
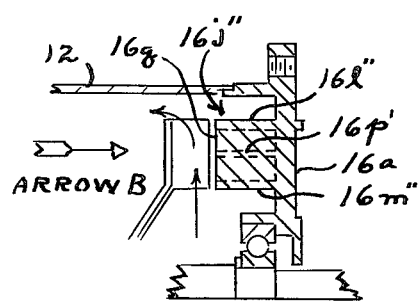
FIG. 5(a) illustrates a partial cross-sectional side elevation of a prior art motor having another alternative embodiment of the novel endplate including a baffle as taught by this invention.
Figure 5B:
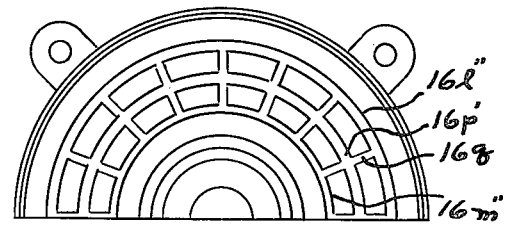
FIG. 5(b) illustrates a plan view of the end plate of FIG. 5(a) viewed in the direction of arrow "B".

In FIG. 5(a), it can be seen that another alternative baffle 16(j)'' includes first, second and third concentric tubular baffle portions 16(l)'', 16(m)'', and 16(p)' formed with and axially protruding from endwall 16(a) and also includes a plurality of radially extending interconnecting spoke-like ribs 16(g). Thus, the baffle protrudes from endwall 16(a) and terminates at a face portion predeterminately spaced from endwall 16(a) comprising a plurality of concentric rings 16(l)'', 16(m)'' and 16(p)' interconnected by a plurality of ribs 16(q).

With the baffle 16(j) formed on and protruding from endwall 16(a) as hereinabove described, it can be seen that when endplate 16 is mounted on motor housing 12 as best illustrated in FIG. 3(a), baffle 16(j) axially extends from endwall 16(a) toward and in proximity with blower blades 30 for forming a partial annular spaced interface with the blower blades. Due to opening 16(e) in sidewall 16(b) and corresponding opening 16(k) in baffle 16(j), the baffle and blower blades form a partial annular interface when blower blades 30 are rotated through 360 degrees in the usual manner.

In operation, when endplate 16 is mounted on housing 12 as illustrated in FIG. 3(a) and blower blades 30 are rotated 360 degrees on shaft 14, in the usual manner, air is drawn into the motor through sidewall slot 16(e) and corresponding baffle opening 16(k). The air is subjected to a spaced annular interface between the rotating blades and the partial annular face of baffle 16(j). Eventually, the air is forced past rotor 24 and stator 26 thus cooling the motor 12.

The foregoing has described a novel face-type endplate including a cast-in or molded-in baffle-like structure and a vented sidewall so that the benefits of the blower blade/baffle combination can be preserved in connection with a solid face-type endplate in addition to the cost saving benefits of eliminating the baffle as an extra part both as to production and installation. Also, surprisingly and unexpectedly, less than a 360 degree spaced annular interface between the baffle and the blower blades permits adequate cooling.

Other modifications and variations are possible in the light of the above teachings. It is therefore to be understood that within the scope of the appended claims the invention may be practiced otherwise than as specifically described.

What is claimed is:

1. In an endplate for electric motors including an annular endwall portion in the endplate, and an annular side wall portion in the endplate protruding axially from the endwall and including a radially directed opening formed therein; the improvement comprising:

an annular baffle portion in the endplate protruding axially from the endwall and including a radially directed passage therein extending through the baffle to the opening in the sidewall, the baffle portion terminating at a less than 360 degree radial face thereof.

2. In a cooling system for electric motors of the type including a housing and a shaft extending through the housing, blower blades mounted on the shaft for 360 degree rotation therewith, an endplate mounted on the housing, an annular endwall portion in the endplate and an annular sidewall portion in the endplate protruding axially from the endwall and including a radially directed opening therein, the improvement comprising:

an annular baffle portion in the endplate protruding axially from the endwall and including a radially directed passage formed therein extending through the baffle to the opening in the sidewall, the baffle terminating at a less than 360 degree radial face thereof adjacent the blades.

* * * * *